CONTROL APPARATUS FOR PROGRAM DISTRIBUTION OF BROADCAST AND RECORDED VIDEO INFORMATION
Filed Sept. 16, 1966
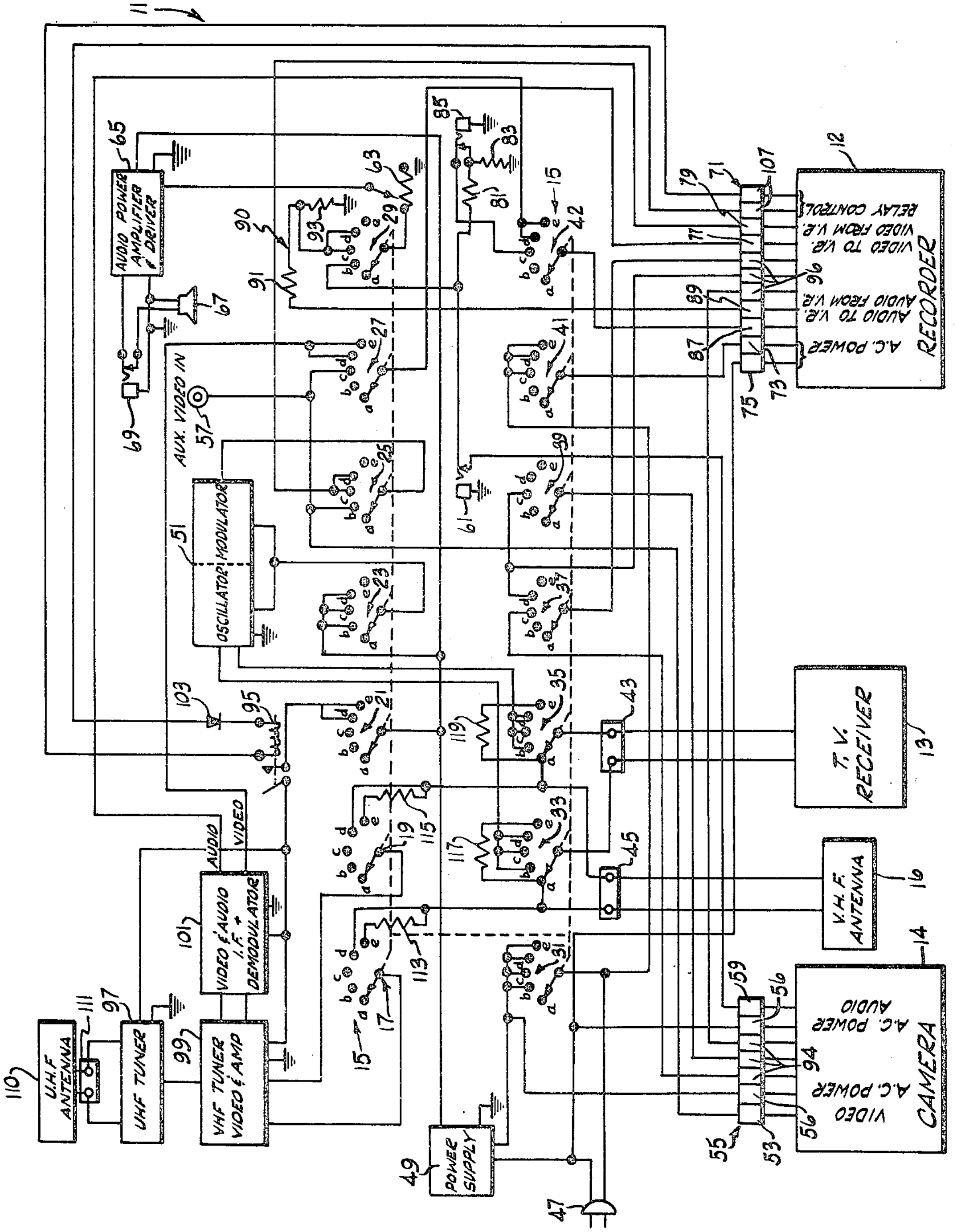
Inventors
LEONARD KOWAL
RUDOLPH STARAI
By Anderson, Luedeka, Fitch, Even & Tabin Attys.

United States Patent Office 3,484,548
Patented Dec. 16, 1969

3,484,548

CONTROL APPARATUS FOR PROGRAM DISTRIBUTION OF BROADCAST AND RECORDED VIDEO INFORMATION

Leonard Kowal, Chicago, and Rudolph Starai, Arlington Heights, Ill., assignors to Ampex Corporation, Redwood City, Calif., a corporation of California Filed Sept. 16, 1966, Ser. No. 579,880
Int. Cl. H04n 7/02
U.S. Cl. 178—6 5 Claims This invention generally relates to an apparatus for coordinating and controlling the operation of a video tape recorder and the various apparatus which may be associated therewith. More particularly, it relates to an apparatus for coordinating and controlling the operation of a video tape recorder and apparatus such as a television camera, a television receiver, etc., which may be connected thereto.

Conventional television receivers include a UHF and a VHF tuner into which the broadcast signal from the antenna is introduced. The intermediate frequency signal at the output of the tuners is then demodulated by suitable circuitry to obtain the various sound and video signals. Presently available video tape recorders are designed to record and play back such demodulated video and sound signals. To connect such recorders with a conventional television receiver so as to record the demodulated video and sound and then play back video and sound on the television receiver, it has been necessary to considerably modify the receiver so as to connect the recorder into the receiver at a point after demodulation has taken place. Often such receiver modifications are expensive and difficult to accomplish.

Also, it is desirable to employ a television camera and a microphone in combination with the video recorder and viewing receiver. Previously, the receiver circuit has been modified to permit the camera and a microphone to be connected thereto.

It is desirable that the previously mentioned apparatus be used in various cooperative combinations selectable at the discretion of the operator. Such cooperation should be accomplished with a minimum of equipment modification.

An object of the present invention is to provide a control center for cooperatively connecting, at the discretion of the operator, a video tape recorder with various apparatus which may be associated therewith. A more particular object is to provide a control center for cooperatively connecting a video tape recorder, a viewing receiver and a signal source which will result in a minimum of equipment modification.

Other objects and advantages of the present invention will become apparent through reference to the following description and accompanying drawing which shows an illustrative embodiment of this invention.

The single figure is a partially schematic and partially diagrammatic illustration of a preferred embodiment of a video control center in accordance with this invention.

Briefly, the control center 11 is adapted to be connected to a video tape recorder 12, a conventional television receiver 13, and a television camera 14, without substantial modification of any of the aforesaid apparatus. As illustrated, the control center includes a switch means 15 having five positions each of which may be selected by the operator to obtain a particular mode of operation. In a first mode, wherein the switch means 15 is in its position *a*, the control center is disabled and the television receiver 13 is connected to a conventional television antenna 16, for general broadcast reception. When the switch means 15 is moved to position *b*, the control center 11 is in its second mode which permits closed circuit television viewing between the television camera 14, a microphone (not shown), and the television receiver 13. In the third mode, wherein the switch means 15 is in its position *c*, the control center permits the operator to record and play back with the recorder 12, video signals from the television camera 14 and monitor upon the television receiver 13 the signal being recorded. The fourth mode of operation is selected by moving the switch means 15 to its position *d* and in this position the recording and playback of broadcast signals upon the video recorder 12 is allowed. In the last mode, which is selected by moving switch means 15 to position *e*, the control center 11 permits recording of one broadcast signal upon the recorder 12 while viewing still another broadcast signal upon the receiver 13.

More particularly, the modes of operation of the control center are selected by positioning switch means 15 which, in the illustrated embodiment, is a multi-section, rotary switch including sections 17 to 42. In the drawing, the contacts which are closed when the switch is in a position corresponding to a particular mode of operation are indicated with the reference numeral of the section plus the subscript corresponding to that mode of operation. To facilitate the description of the control center, the circuit which is energized in each mode of operation is described hereinafter.

As previously indicated, position *a* of the selector switch 15 corresponds to the first mode of operation, wherein the control center 11 is deenergized and the VHF antenna 16 is connected through the switch 15 to the television receiver for normal broadcast viewing. In this position of the switch, the sections 17 through 31 and 37 through 42 are open. The wipers of the sections 33 and 35 (hereinafter referred to as receiver input sections), which rest upon their respective fixed contacts **33*a* and 35*a*, are connected to respective terminals of a terminal board 43, which is connected to the antenna terminals (not shown) of the television receiver 13. The fixed contacts 33*a* and 35*a* of the receiver input sections 33 and 35 are each connected to one terminal of a terminal board 45 which is connected to the VHF antenna 16**. Thus, in position *a*, the television receiver antenna terminal is directly connected to the VHF antenna 16 for normal broadcast reception.

Position *b* of the selector switch 15 corresponds to the second mode of operation which provides a closed circuit television system between the camera 14 and the television receiver 13. In this position of the switch, sections 17, 19, 21, 27, and 37 to 42 are open. The wiper of the section 31 (hereinafter referred to as the power supply energizing section), which rests upon fixed contact **31*b* is connected to one side of commercial power source (not shown) through a plug 47. The contact 31*b* is connected to a direct current power supply 49, which may be of conventional construction. The other input terminal of the power supply 49 is connected to the remaining terminal of the plug 47. The negative output of the supply 49 is grounded and the positive high voltage output is fed through the contact 23*b* and the wiper of the switch section 23, (hereinafter referred to as the oscillator-modulator energizing section) to an oscillator-modulator unit 51, thereby energizing the same. The oscillator-modulator unit 51, which may be of conventional construction, converts a video signal applied thereto into a broadcast video signal at a carrier frequency corresponding to a VHF channel. The applied video signal is the video signal from the television camera 14 which is coupled through a pin 53 of a camera connecting socket 55 to a fixed contact 25*b* of the switch section 25 (hereinafter referred to as the oscillator-modulator input section) and through the wiper thereof to the input of the oscillator-modulator unit 51**. A-C power for the camera is supplied thereto by the pins 56 of the camera connecting socket 55, which pins are connected to the plug 47. If desired, an auxiliary video signal may be fed to the input of the oscillator-modulator 51 via a jack 57 connected to the contact 25*b* of the oscillator-modulator input section 25.

The output of the oscillator-modulator unit 51 which is in the form of a broadcast video signal is fed to the antenna terminals of the television receiver 13. In this connection, the output is coupled to the fixed contacts 33*b* and 35*b* of the receiver input sections 33 and 35 which, in turn, are coupled through the wipers of the sections to the respective terminals on the antenna terminal board 43.

Also, in position *b*, a circuit is provided for amplifying and converting the audio signal from the microphone which may be associated with the camera 14, into sound. In this connection, the audio signal from the microphone is coupled to a pin 59 of the camera connecting socket 55 which is connected to the shorting contact of a line jack 61. The pin contact of the jack 61 is connected to the fixed contact *b* of the switch section 29 (hereinafter referred to as the audio input section). The audio signal is fed through the wiper thereof to a volume control 63 the wiper of which is connected to the input of an audio amplifier 65, which may be of conventional construction, and is energized by the output of power supply 49. A speaker 67 and an auxiliary speaker jack 69 are connected across the output terminals of the amplifier 65. The line jack 61 permits a high impedance audio signal to be introduced into the audio amplifier 65.

Position *c* of the selector switch 15 connects the television camera 14 to the video recorder 12 and permits monitoring by the television receiver 13 of the signal being recorded. The power supply 49 is turned on by fixed contact 31*c* of the power supply energizing section 31 thereby providing high voltage to the audio amplifier 65 and to the modulator-oscillator unit 51 through the wiper and fixed contact 23*c* of the oscillator-modulator energizing section 23. A-C power is supplied to the recorder, which is connected to a connector 71, by means of the fixed contact 41*c* and wiper of the section 41 (hereinafter referred to as the recorder energizing section). One side of the plug 47 is connected to the fixed contact 41*c* and the wiper is connected to a pin 73 of the connector 71, the other side of the plug 47 being connected to a second pin 75 of the connector 71. The video signal from the camera 14, which is at the pin 53 of the connector 55 is fed to fixed contact 27*c* of switch section 27 (hereinafter referred to as the recorder video input section) and through the wiper thereof to a video input pin 77 of the connector 71. If desired, an auxiliary video signal may be fed to the recorder via the jack 57, the pin of which is connected to the fixed contact 27*c* of the recorder video input section 27.

The video signal being recorded is monitored by the television receiver 13. Specifically, the video signal from the recorder is fed through a pin 79 of the connector 71 to the fixed contact 25*c* of the oscillator-modulator input section 25 and through the wiper thereof to the input of the oscillator-moduator 51. The oscillator-modulator 51 is energized by the power supply 49 which is connected to the oscillator-modulator through the fixed contact 23*c* of the oscillator-modulator energizing section. The power supply 49, in turn, is energized by the fixed contact 31*c* of the power supply energizing section 31. The modulated signal from the oscillator-modulator unit 51 is fed to the fixed contacts 33*c* and 35*c* of the receiver input sections 33 and 35. The wipers of these sections are connected to the television receiver 13 through the terminal board 43. Thus, the signal being recorded is monitored by the receiver 13. Likewise, during playback of the recorder 12, the video signal is displayed on the receiver 13.

The audio output from the microphone which is at the pin 59 of the connector 55, is fed through the line jack 61 and across the series connected impedance matching resistors 81 and 83. The audio signal developed across the grounded resistor 83 is connected to the shorting contact of a jack 85 and the pin of the jack is connected to fixed contact 42*c* of the section 42 (hereinafter referred to as the recorder audio input section) and through the wiper thereof and to an audio input pin 87 of the recorder connector 71. The resistors 81 and 83 function to match the high impedance output of the camera 14 audio signal to the low impedance of the video tape recorder 12. If desired a low impedance microphone may be inserted into the jack 85. Since the jack 85 is series connected, insertion of a low impedance microphone therein disconnects the audio output of the camera 14 from the recorder 12.

The audio signal being recorded is monitored by the speaker 67. In this connection, the high power audio output from the recorder 12 is obtained at a pin 89 of the recorder connector 71 and is fed through a voltage reducing network 90 to contact 29*c* of the audio input section 29. The network 90 comprises series connected resistors 91 and 93. One terminal of the resistor 93 is grounded and one terminal of the resistor 91 is connected to the pin 89. The signal developed at the common resistor connection is fed through the wiper of the audio input section 29 to the volume control 63 and to the audio amplifier 65 for reproduction by the speaker 67.

Two other switch sections are employed in the position *c* mode of operation. These are switch sections 37 and 39 which are employed to coordinate the operational functions of the camera and the recorder. The switch sections 37 and 39 connect connector pins 94 of the camera connector 55 to pins 96 of the recorder connector 71.

Position *d* of the selector switch 15 connects a broadcast signal to the recorder 12 and permits monitoring of the recorded signal upon the television receiver 13. The power supply 49 and the recorder 12 are respectively turned on by the power supply energizing section 31 and the recorder energizing section 41. High voltage from the power supply 49 is fed to the audio amplifier 65 and through fixed contact 23*d* of the oscillator-modulator energizing section 23 to the oscillator-modulator unit 51. The high voltage output is also connected to the wiper of the switch section 21 (hereinafter referred to as the tuner energizing section) and the fixed contact 21*d* thereof is connected to the fixed contact of a normally open relay 95. The movable contact of the relay 95 is connected to a UHF tuner 97, a VHF tuner 99 and a video and audio demodulator 101, all of which may be of conventional construction. The direct current coil of the relay 95 is connected through a rectifier diode 103 to pins 107 of the recorder connector 71. Upon application of A-C voltage across the pins 107, which may be provided by the recorder 12 during its record mode of operation, the relay 95 closes thereby providing high voltage to the UHF and VHF tuners 97 and 99 and to the demodulator 101.

A VHF signal is fed from the VHF antenna 16 to the terminal board 45 and therefrom to the fixed contacts 17*d* and 19*d* of the switch sections 17 and 19 (hereinafter referred to as the VHF input sections). The wipers of the VHF input sections 17 and 19 are connected to the input terminals of the tuner 99. The signal from a UHF antenna 110 is fed through a UHF terminal board 111 to the input terminals of the UHF tuner 97. The output of the UHF tuner 97 is fed to the UHF tuner input of the VHF tuner 99. The VHF tuner 99 is provided with a UHF position which permits the UHF tuner output to be fed directly therethrough to the video and audio demodulator 101. The video signal from the demodulator 101 is fed to the fixed contact 27*d* of the recorder video input section 27 and through the wiper thereof to the video input pin 77 of the recorder connector 71. The audio signal from the demodulator 101 is connected to fixed contact 42*d* of the recorder audio input section 42 and fed from the wiper thereof to the audio input pin 87 of the recorder connector 71.

The audio and video signal being recorded upon the video tape are monitored by the speaker 67 and the television receiver 13. Specifically, the audio signal from the recorder 12, at pin 89 of the connector 71 is fed through the voltage reduction network 90 to the fixed contact 29*d* of the audio input section 29 and from the wiper thereof through the volume control 63 to the audio amplifier 65 for reproduction by the speaker 67. The video signal being recorded is fed from the pin 79 of the recorder connector 71 to the fixed contact 25*d* of the oscillator-modulator input section 25 and through the wiper thereof to the input of the oscillator-modulator unit 51. The modulated output signal is coupled to fixed contacts 33*d* and 35*d* of the receiver input sections 33 and 35 and through the wipers thereof to the terminal board 43 and thus to the television receiver 13.

It should be noted that in this, as well as the previously described switch positions *b* and *c*, an audio signal is not supplied to the television receiver 13, rather the control center audio power amplifier 65 and speaker 67 are substituted therefor.

Position *e* of the selector switch 15 permits recording of one broadcast signal upon the video tape recorder 12 and simultaneous viewing of still another broadcast signal upon the receiver 13. The UHF tuner 97, the VHF tuner 99 and the demodulator 101 are energized as in the previous switch position (i.e., position *d*). When a UHF signal is to be recorded the VHF tuner 99 is in its UHF position and the signal from the UHF tuner 97 is fed therethrough to the demodulator 101. If the VHF signal is to be recorded, it is fed from the VHF antenna terminal board 45 through resistors 113 and 115, the purpose of which is described hereinafter, to fixed contacts 17*e* and 19*e* of the VHF input sections 17 and 19. The signal is fed through the wipers of the sections to the input of the VHF tuner 99.

As previously mentioned, the UHF and VHF tuners 97 and 99 cooperate to select the desired broadcast signal to be recorded. The video portion and audio portion of the signal selected are fed to the recorder as in the previous switch position (i.e., position *d*).

Still another broadcast signal or the same signal if desired may be viewed upon the receiver. In this instance, the antenna terminals of the receiver 13 are connected through the terminal board 43 to the wipers of the receiver input sections 33 and 35. Resistors 117 and 119 are connected between fixed contacts 33*e* and 35*e* of the receiver input sections 33 and 35 and the VHF antenna terminal board 45. Thus the VHF signal is provided with a direct path to the receiver. The resistors 113, 115, 117 and 119 are, in the illustrated embodiment, 150 ohms and function to match the 300 ohm receiver antenna input impedance and the 300 ohm antenna impedance to the 300 ohm input impedance of the VHF tuner. The 150 ohm resistors 113 and 115 are in series with the VHF antenna terminals thereby presenting a 600 ohm load. The receiver input terminals together with the series resistors 117 and 119 also present a 600 ohm impedance source. The two parallel 600 ohm impedances present a proper 300 ohm impedance match to the 300 ohm terminals of the VHF tuner 99.

In position *e* of the selector switch 15, the receiver 13 functions in its normal manner. In the event it is desired to play back the signal recorded, the operator merely returns the selector switch to position *d*. As previously mentioned, position *d* of the selector switch 15 connects the video signal from the video tape recorder 12 through the oscillator-modulator unit 51 to the television receiver 13. The audio signal from the recorder 12 is not fed to the receiver 13 in switch position *d* but is amplified by the audio power amplifier 65 and reproduced by the speaker 67.

Thus, a control system has been provided which allows the operator to select five modes of operation. The first, position *a*, deenergizes the control center 11 and permits direct viewing of a television broadcast signal. The second, position *b*, connects the television camera 14 directly to the television receiver 13 through the oscillator-modulator unit 51. In position *c*, the signal from the camera is connected to the recorder 12 for recording and the signal recorded is fed into the oscillator-modulator unit 51, for monitoring by the television receiver 13. Position *d* of the selector switch connects the antenna to the tuners 97 and 99 and the signal received is demodulated and fed into the recorder 12. The audio and video signals being recorded upon the tape are respectively monitored by the television set 13 and by the speaker 67. In position *d* of the selector switch the operator is allowed to view a broadcast signal upon the receiver 13 and simultaneously record upon the video tape recorder 12 that broadcast signal. In position *e* the one broadcast signal may be recorded while another broadcast signal is being viewed on the receiver.

Although but one specific embodiment of this invention has been hereinbefore shown and described, it will be understood that details of the construction shown may be altered without departing from the spirit of this invention as defined by the following claims:

What is claimed is:

1. A control apparatus for use with a television receiver having antenna terminals, a video recorder, a source for providing a video signal, and a source of broadcast television signals, said apparatus comprising an oscillator tunable to one of the channels tunable by said receiver, a video modulator coupled to said oscillator for modulating the output thereof, a television tuner for receiving the broadcast television signals, a demodulator coupled to said tuner for demodulating the broadcast signals, and switching means including means for selectively coupling the video signal to the input of said modulator, means for selectively coupling the video signal or the demodulated video broadcast signals from the demodulator to said recorder, and means for coupling the modulated output of said oscillator to the antenna terminals of said receiver.

2. The control apparatus of claim 1 wherein said switching means includes means for selectively coupling the video output of said recorder to said modulator.

3. The control apparatus of claim 1 wherein said switching means includes means for selectively coupling said broadcast television signals directly to said receiver.

4. The control apparatus of claim 1 further comprising an audio speaker, said switching means including means for coupling the demodulated audio portion of the broadcast television signals from said demodulator to said recorder and means for coupling the audio signal from said recorder to said speaker.

5. The control apparatus of claim 1 for use with an audio speaker and a source providing an audio signal, said switching means including means for coupling the audio signal to said recorder and means for coupling the audio signal from said recorder to said speaker.

References Cited

UNITED STATES PATENTS

| | | |
|---|---|---|
| 2,976,354 | 3/1961 | Banning et al. |
| 3,008,001 | 11/1961 | Reith. |
| 3,278,680 | 10/1966 | Hummel. |

ROBERT L. GRIFFIN, Primary Examiner

DONALD E. STONE, Assistant Examiner

U.S. Cl. X.R.

178—6.6